United States Patent
Sloan

Patent Number: 5,314,628
Date of Patent: May 24, 1994

[54] DE-CHLORINATED WATER SUPPLY METHODS

[76] Inventor: Frank P. Sloan, 1601-19 Lascelles Blvd., Toronto, Ontario, Canada, M4V 2B7

[21] Appl. No.: 944,375

[22] Filed: Sep. 14, 1992

[51] Int. Cl.$^5$ ............................................. C02F 1/76
[52] U.S. Cl. .................................. 210/754; 210/764; 210/806; 210/130
[58] Field of Search .................. 210/754–756, 210/741, 790, 99, 130, 132, 420, 764, 806

[56] References Cited

U.S. PATENT DOCUMENTS

| | | | |
|---|---|---|---|
| 3,019,185 | 1/1962 | Fouilland et al. | 210/420 |
| 3,306,451 | 2/1967 | Kudlaty | 210/420 |
| 4,001,120 | 1/1977 | Gelman et al. | 210/420 |
| 4,595,500 | 6/1986 | Galbiati | 210/266 |
| 4,681,677 | 7/1987 | Kuh et al. | 210/130 |
| 5,196,126 | 3/1993 | O'Dowd | 210/754 |

*Primary Examiner*—Peter A. Hruskoci
*Attorney, Agent, or Firm*—Rogers & Scott

[57] ABSTRACT

The likelihood of proliferation of micro-organisms in a downstream conduit connecting the outlet of a chlorine filter to a de-chlorinated water outlet in a water supply system when no water is flowing in the conduit is reduced by providing a by-pass conduit between the upstream conduit and the downstream conduit. The flow of chlorinated water through the by-pass conduit is prevented when water is flowing from the chlorinated water inlet through the upstream conduit, the filter and the downstream conduit to the de-chlorinated water outlet. Chlorinated water in the upstream conduit is permitted to communicate through the water in the by-pass conduit with de-chlorinated water in the downstream conduit when no water is flowing in the upstream conduit, the filter and the downstream conduit to enable chlorine in the chlorinated water in the upstream conduit to migrate through the water in the by-pass conduit into the de-chlorinated water in the downstream conduit to reduce the likelihood of proliferation of micro-organisms therein.

3 Claims, 1 Drawing Sheet

DE-CHLORINATED WATER SUPPLY METHODS

This invention relates to de-chlorinated water supply systems.

In a conventional de-chlorinated water supply system, chlorinated water passes from a chlorinated water inlet through an upstream conduit to the inlet of a chlorine filter, and de-chlorinated water passes from the outlet of the filter through a downstream conduit to a de-chlorinated water outlet. However, when such a system has not been used for a period of time, the absence of chlorine in the water in the downstream conduit permits micro-organisms to proliferate therein, thereby creating the possibility of contaminated water being obtained from the outlet when the system is next used.

It is therefore an object of the invention to provide a water supply system which reduces the likelihood of proliferation of micro-organisms in the downstream conduit of such a system when the system is not being used.

According to the present invention, a by-pass conduit is provided between the upstream conduit and the downstream conduit. Flow of chlorinated water through the by-pass conduit is prevented when water is flowing from the chlorinated water inlet through the upstream conduit, the filter and the downstream conduit to the de-chlorinated water outlet. However, when no water is flowing from the de-chlorinated water inlet to the de-chlorinated water outlet, through the upstream conduit, the filter and the downstream conduit, chlorinated water in the upstream conduit is permitted to communicate through the water in the by-pass conduit with de-chlorinated water in the downstream conduit to enable chlorine in the chlorinated water in the upstream conduit to migrate through water in the by-pass conduit into the de-chlorinated water in the downstream conduit to reduce the likelihood of proliferation of micro-organisms therein.

A valve may be provided in the by-pass conduit, the valve being closed by water pressure difference between the upstream conduit and the downstream conduit when water is flowing from the chlorinated water inlet through the upstream conduit, the filter and the downstream conduit to the de-chlorinated water outlet and being open in the absence of water pressure difference between the upstream conduit and the downstream conduit when no water is flowing from the chlorinated water inlet through the upstream conduit, the filter and the downstream conduit to the de-chlorinated water outlet to enable chlorine in the chlorinated water in the upstream conduit to migrate through water in the by-pass conduit and the open valve into the de-chlorinated water in the downstream conduit to reduce the likelihood of proliferation of micro-organisms therein.

The valve may comprise a housing having an aperture through which when open chlorine can migrate from chlorinated water in the upstream conduit into de-chlorinated water in the downstream conduit and a movable valve member in the housing which is caused by the water pressure difference between the upstream conduit and the downstream conduit to close the aperture and which is caused by the absence of the water pressure difference to move away from the aperture to permit the chlorine migration.

Advantageously, the housing is shaped to permit the valve member to be moved by gravity away from the aperture in the absence of the water pressure difference.

One embodiment of the invention will now be described, by way of example only, with reference to the accompanying drawings, of which;

BRIEF DESCRIPTION OF THE DRAWINGS

Referring to the drawings, FIG. 1 shows a de-chlorinated water supply system in which a chlorinated water supply 10 is connected by an upstream conduit 12 to the inlet of a sediment filter 14. The outlet of filter 14 is connected by conduit 18 to the inlet of a water meter 20, and the outlet of meter 20 is connected by a conduit 22 to the inlet of a chlorine filter 24. The outlet of filter 24 is connected by a downstream conduit 26 to a de-chlorinated water outlet 28.

A by-pass conduit 29 in accordance with the invention is connected between the upstream conduit 12 and the downstream conduit 26, and also in accordance with the invention a valve 30 is provided in by-pass conduit 29.

Figure 2:
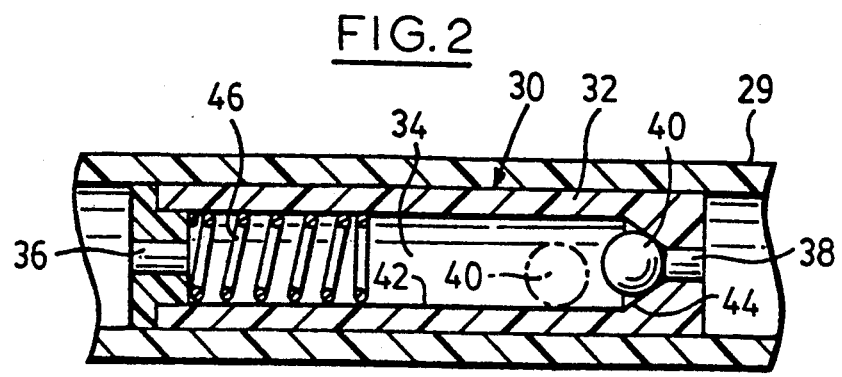
FIG. 2 is a cross-sectional view of the by-pass valve in the closed condition when water is flowing in the system, the open condition when no water is flowing in the system being indicated by showing the open position of the spherical valve member in dotted outline.

As shown in FIG. 2, the valve 30 comprises an elongated housing 32 with an elongated chamber 34 and apertures 36, 38 at opposite ends 34. Aperture 36 provides communication between the chamber 34 and the portion of by-pass conduit 29 connected to upstream conduit 12. Aperture 38 permits communication between chamber 34 and the portion of by-pass conduit 29 communicating with dowstream conduit 26. The chamber 34 contains a spherical valve member 40 which is freely moveable in the chamber 34. The major portion 42 of the wall of the chamber 34 is cylindrical with a diameter somewhat larger than the diameter of the spherical valve member 40. Adjacent the aperture 38, which has a somewhat smaller diameter than the diameter of spherical valve member 40, the chamber 34 has a tapered wall portion which provides an inclined surface 44 from the aperture 38 to the cylindrical major wall portion 42.

Figure 1:
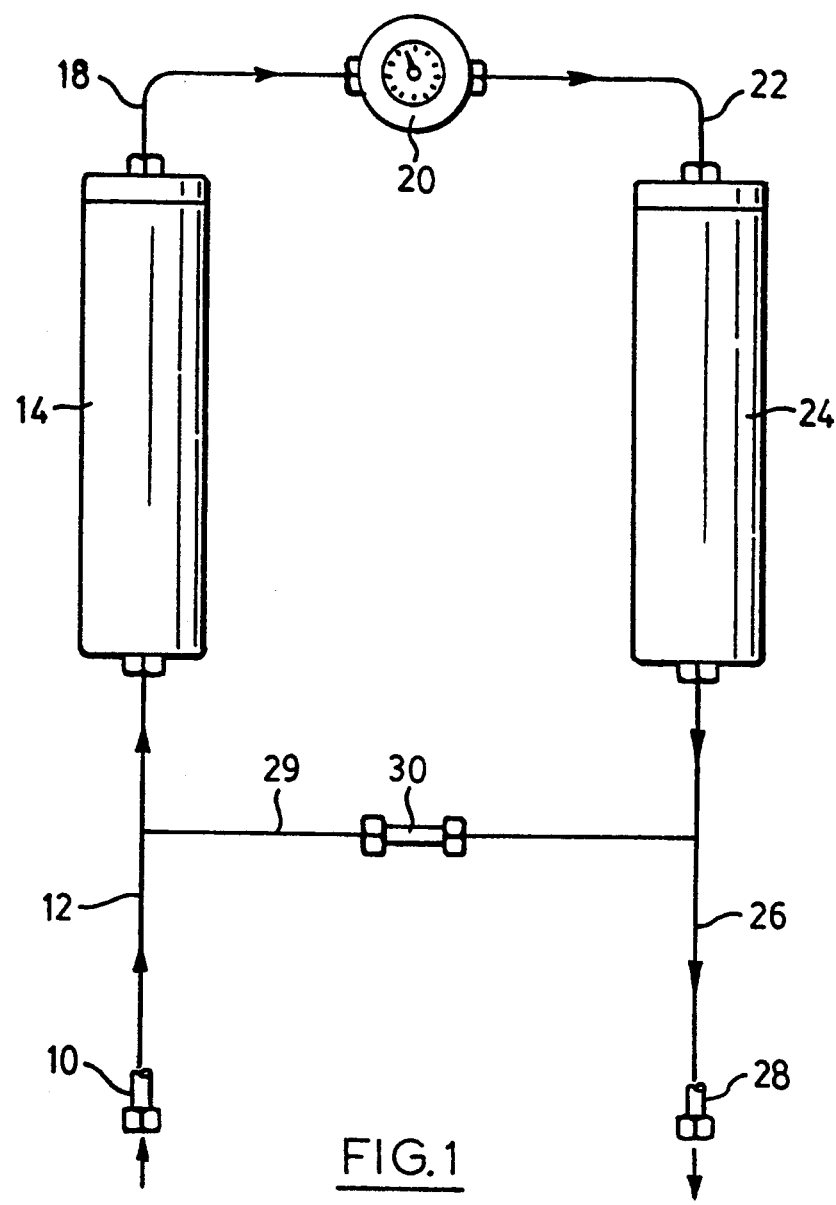
FIG. 1 is a flow diagram of a de-chlorinated water supply system in accordance with the invention.

In use, the water supply system is arranged so that the valve 30 is horizontal as shown in FIGS. 1 and 2. When water is flowing in the system, there is a pressure drop across the filters 14, 24 so that there is a pressure difference between the upstream conduit 12 and the downstream conduit 26. The resultant tendency for water to flow through the by-pass conduit 29 and valve 30 causes the valve member 40 to be pushed up the inclined surface 44 in the valve housing 32 into engagement with adjacent end of the aperture 38, thereby closing the valve 30 (as shown in FIG. 2) to prevent water from flowing through the by-pass conduit 29.

When no water is flowing in the system, there is no pressure drop across the filters 14, 26, and thus no pressure difference between the upstream conduit 12 and the downstream conduit 26. Spherical valve member 40 is then caused by gravity to roll down the inclined surface 44 in the valve housing 32 away from the aperture 38, as shown in dotted outline in FIG. 2. In this position, the valve 30 is open and chlorine in the water in upstream conduit 12 can migrate through the water in by-pass conduit 31 and valve 30 into the downstream conduit 26 to reduce the likelihood of proliferation of micro-organisms therein.

A helical spring 46 is provided in the valve chamber 34 adjacent the aperture 36 to ensure that the valve member 40 cannot travel to the opposite end of chamber 34 and prevent migration of chlorine through aperture 36.

The water meter 20 is provided to indicate the volume of water which has flowed through the system, thereby providing an indication of when the filters 14, 24 require to be changed.

In one installation in accordance with the invention, the following test results were obtained with a chlorinated water supply containing 0.53 mg/l chlorine, the chlorine content in the water being measured with a Hach DR/2000 Digital Spectrophotometer.

| SAMPLE FROM OUTLET | CHLORINE CONTENT (mg/l) |
|---|---|
| After 5 min. flush | 0 |
| After 30 min. rest | |
| 1st 250 m/l | 0 |
| 2nd 250 m/l | 0 |
| 3rd 250 m/l | 0.03 |
| 4th 250 m/l | 0.02 |
| After 4 hr. rest | |
| 1st 250 m/l | 0 |
| 2nd 250 m/l | 0.02 |
| 3rd 250 m/l | 0.08 |
| 4th 250 m/l | 0.04 |
| After 24 hr. rest | |
| 1st 250 m/l | 0.06 |
| 2nd 250 m/l | 0.16 |
| 3rd 250 m/l | 0.08 |
| 4th 250 m/l | 0.02 |

After 72 hours of rest, four additional 250 ml volumes of filtered water were tested and as expected no chlorine was found. It is normal for even an unfiltered chlorinated water supply not to have any residual chlorine therein after such a prolonged period of time.

The test results show that when a water supply system in accordance with the invention is shut off for a reasonable period of time, sufficient chlorine migrates to the downstream conduit to reduce the likelihood of proliferation of micro-organisms therein.

Although in the preferred embodiment the valve 30 is horizontal, it may be oriented so that the end with aperture 38 is higher than aperture 36 provided of course that the water pressure difference when water is flowing in the system is sufficient to force the valve member 40 upwardly to close aperture 38. The valve 30 should clearly not be oriented with the end with aperture 38 lower than the end with aperture 36 because this would prevent the valve member 40 from moving away from aperture 38 when there is no water pressure difference, i.e. when no water is flowing in the system. If desired, two or more valves 30 with different angular orientations may be connected in parallel flow arrangement to reduce the likelihood of such an occurrence.

Instead of the valve 30 being provided with a spherical valve member 40, the valve member 40 may be replaced by a resilient diaphragm suitably secured across the housing 32 and having a central imperforate area which is caused by the water pressure difference to engage the aperture 38. In the absence of the water pressure difference, the central imperforate area of the diaphragm moves away from the aperture 38 so that chlorine can migrate through one or more holes provided in the peripheral area of the diaphragm.

Other embodiments of the invention will be readily apparent to a person skilled in the art, the scope of the invention being defined in the appended claims.

I claim:

1. A method of reducing proliferation of micro-organisms in a downstream conduit connecting an outlet of a chlorine filter to a de-chlorinated water outlet in a chlorinated water supply system when no water is flowing in said conduit, comprising providing a by-pass conduit between an upstream conduit connecting a chlorinated water inlet from said supply system to the chlorine filter inlet and the downstream conduit and also providing a valve in said by-pass conduit, closing said valve by water pressure difference between the upstream conduit and the downstream conduit by flowing said water from the chlorinated water inlet through the upstream conduit, the filter and the downstream conduit to the de-chlorinated water outlet and opening said valve in the absence of water pressure difference between the upstream conduit and the downstream conduit by shutting off flow of said water from the chlorinated water inlet through the upstream conduit, the filter and the downstream conduit to the de-chlorinated water outlet for a sufficient time to enable chlorine in the chlorinated water in the upstream conduit to migrate through water in the by-pass conduit and the open valve into the de-chlorinated water in the downstream conduit to reduce proliferation of micro-organisms therein.

2. A method according to claim 1 wherein said valve comprises a housing having an aperture through which when open chlorine can migrate from chlorinated water in the upstream conduit into de-chlorinated water in the downstream conduit, and a movable valve member in said housing which is caused by said water pressure difference between the upstream conduit and the downstream conduit to close said aperture and which is caused by the absence of said water pressure difference to move away from the aperture to permit said chlorine migration.

3. A method according to claim 2 wherein said housing is shaped to permit the valve member to be moved by gravity away from the aperture in the absence of said water pressure difference.

* * * * *